United States Patent [19]

Steer

[11] Patent Number: 4,860,541
[45] Date of Patent: Aug. 29, 1989

[54] TWO STAGE RELIEF VALVE FOR MASTER CYLINDER QUICK-FILL CHAMBER

[75] Inventor: John E. Steer, South Bend, Ind.

[73] Assignee: Allied-Signal Inc., Morristown, N.J.

[21] Appl. No.: 250,049

[22] Filed: Sep. 28, 1988

[51] Int. Cl.[4] .................. B60T 11/16; B60T 11/34; F16K 15/04; F16K 15/14
[52] U.S. Cl. .................................... 60/578; 137/512.2
[58] Field of Search ............... 60/574, 576, 578, 585, 60/586, 588, 591, 592; 137/512.2

[56] References Cited

U.S. PATENT DOCUMENTS

| | | | |
|---|---|---|---|
| 3,307,667 | 3/1967 | Maurice | 60/588 X |
| 3,749,121 | 7/1973 | Frankewich | 137/512.2 |
| 4,370,102 | 1/1983 | Sasaki et al. | 137/512.2 X |
| 4,455,832 | 6/1984 | Gaiser et al. | 60/588 X |
| 4,472,940 | 9/1984 | Kubota | 60/578 X |
| 4,640,098 | 2/1987 | Brademeyer et al. | 60/578 |
| 4,694,651 | 9/1987 | Yardley et al. | 60/578 |

FOREIGN PATENT DOCUMENTS 71658 6/1981 Japan ..................................... 60/578
156570 12/1981 Japan ................................. 137/512.3

*Primary Examiner*—Robert E. Garrett
*Assistant Examiner*—George Kapsalas
*Attorney, Agent, or Firm*—Leo H. McCormick, Jr.; Ken C. Decker

[57] ABSTRACT

A two stage relief valve for a quick-fill master cylinder (10). The two stage relief valve (54) has a ball (88) that is biased against a first seat (82) to control the flow of fluid from a quick-fill chamber (30) and a unitary structure (55, 74) which is biased against a second seat (70) to further control the flow of fluid from the quick-fill chamber (30). A first predetermined fluid pressure moves the ball (88) off the first seat (82) to allow fluid to escape from the quick-fill chamber (30). A second predetermined fluid pressure moves the unitary structure (55, 74) to allow additional fluid to escape and thereby limit the fluid pressure development in the quick-fill chamber (50).

4 Claims, 1 Drawing Sheet

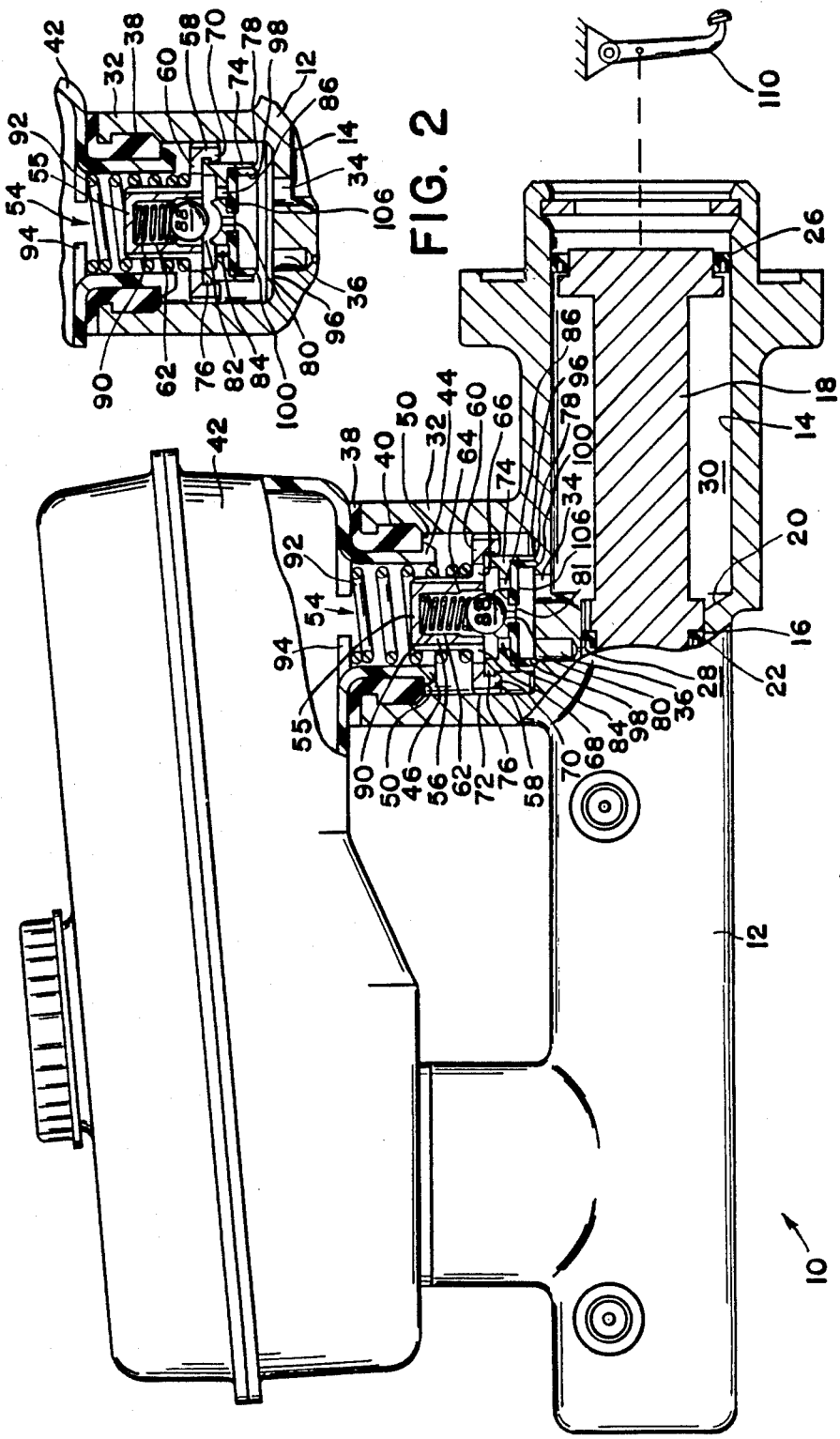

TWO STAGE RELIEF VALVE FOR MASTER CYLINDER QUICK-FILL CHAMBER

BACKGROUND OF THE INVENTION

1. Field of the Invention

This invention relates to a master cylinder having a quick-fill function as the result of movement of a piston in a stepped bore. A resiliently positioned ball located in a unitary structure allows fluid to escape from the quick-fill chamber to limit the fluid pressure level therein. Should the escape of fluid be delayed, the unitary structure moves to provide an additional flow path for the communication of fluid from the quick-fill chamber.

2. Description of the Prior Art

Master cylinders having a quick-fill function are capable of delivering a large quantity of working fluid to a system during the initial stage of the operating stroke thereof, while producing a high pressure in the latter stage of the working stroke thereof. Master cylinders of this type includes a cylinder having a stepped bore and a stepped piston slidably fitted in the stepped bore of the cylinder. The piston and cylinder jointly forming a first pressure chamber within the large diameter of the bore and a second pressure chamber within the small diameter of the bore. The first pressure chamber communicates with a reservoir through a check valve which allows flow of the working fluid from the reservoir to the first chamber when a negative pressure is effective in the first pressure chamber and through a relief valve which allows flow of the working fluid from the first pressure chamber into the reservoir when the pressure effective within the first chamber exceeds a predetermined pressure. The master cylinder is adapted to allow flow of the working fluid from the first pressure chamber into the second pressure chamber through the periphery of a cup seal attached to the piston section of a small diameter of the stepped piston due to the pressure difference between the pressure of the first and second pressure chambers. U.S. Pat. Nos. 4,571,944; 4,694,651 and 4,702,077 are illustrations of master cylinders that incorporate this type of quick-fill function.

It is known that the quick-fill chamber needs to be opened to the reservoir when a predetermined fluid pressure level is achieved in the quick-fill chamber. However, on fast or spike applications the release of fluid from the quick-fill chamber is restricted and as a result more fluid pressure than desired is developed in the quick-fill chamber which reduces the energy transmitted to the main chamber with an end result reducing the operational fluid pressure supplied to the wheel brakes.

SUMMARY OF THE INVENTION

In the present invention, a second stage of operation has been provided whereby an upper limit for the fluid pressure development of the fluid in the quick-fill chamber is achieved. A resiliently positioned ball is carried by a unitary structure that is urged against an annular seat by a spring member. The annular seat surrounds first and second parts that connect a bore with a reservoir. Movement of a piston in the bore creates fluid pressure in the quick-fill chamber which in addition to being communicated to the operational chamber is also communicated through the first and second ports to act on the unitary structure. A first predetermined fluid pressure moves the ball off a seat to allow fluid to escape from the quick-fill chamber. Should the rate at which the fluid pressure in the quick-fill chamber develops exceed the rate of escape of fluid pressure through the ball additional fluid pressure can develop in the quick-fill chamber. When a second fluid pressure level is reached in the quick-fill chamber, the spring member is overcome and the unitary structure moved off the annular seat to allow additional fluid to escape from the quick-fill chamber and thereby limit the development of fluid pressure to a preselected maximum.

It is an object of this invention to provide a master cylinder having a quick-fill function with a two stage relief valve to limit the development of fluid pressure in a quick-fill chamber.

An advantage of the present invention occurs through the two stage relief valve since the development of fluid pressure in a quick-fill chamber is maintained at a level below a fluid pressure that would result in a reduction in the fluid pressure supplied to a brake system during a rapid brake application.

BRIEF DESCRIPTION OF THE DRAWINGS

These objects and advantages should be apparent from reading this specification while viewing the drawings wherein:

FIG. 1 is a schematic illustration of a master cylinder with a sectional view of a two stage relief valve made according to the principles of the invention disclosed herein; and FIG. 2 is a sectional view of the two stage valve of FIG. 1 in an activated position.

DETAILED DESCRIPTION OF THE PREFERRED EMBODIMENT

In FIG. 1 the master cylinder 10 has a body 12 in which there is provided a stepped bore with larger and smaller diameter portions 14 and 16 separated by a shoulder 20. A piston 18 received in the bore carries a seal 22 at its forward end sliding in bore portion 16, and a second seal 26 at its rear end sliding in bore portion 14. A low volume pressurizing chamber 28 is defined in bore portion 16 in front of the piston 18 and a larger volume, quick-fill chamber 30 is defined around the piston 18 between its seals 22 and 26. The body 12 has an integral boss 32, the interior of which forms a passage that communicates with the quick-fill chamber 30 through a Port 34 and with the pressurizing chamber 28, when the piston 18 is in the normal brakes-off position illustrated, through a compensation port 36. The outer end of the boss 32 has a groove 40 for retaining seal 38. A reservoir 42 has a spigot 46 that extends around the seal 40 and engages edge 50 to secure the reservoir 42 to the body 12. A two stage valve means 54 located in the interior of boss 32 controls communication between the reservoir 42 and the stepped bore in body 12.

In more particular detail the two stage valve means 54 has a first cylindrical body 55 with a first diameter section 56 and a second diameter section 58. The first diameter section 56 is connected to the second diameter section 58 by a flange section 60. A bore 62 extends from the flange section 60 into the first diameter section 56 has a stepped diameter such that a shoulder or stop 64 is created therein. A series of axial openings 66 and 68 extend through the flange section 60 while a series of tabs 70 project inwardly from the second diameter section 58. A series of linear slots 72 located on the peripheral surface of the second diameter section 58 allow fluid in the passage to freely flow across the second diameter section 58.

A second cylindrical body 74 has a lip 76 on a first end and an annular face 78 on a second end. Tabs 70 on the first cylindrical body snap over lip 76 to define a unitary structure.

A central opening 80 in cylindrical body 74 is surrounded by a annular seat 82 and a series of openings 84 and 86. An axial groove 81 extends through the seat 82 so that limited free flow of fluid can always occur through central opening 80.

A spherical member or ball 88 located in bore 62 is urged toward seat 82 by a first spring or resilient member 90. A second spring or resilient member 92 located between projection 94 on the reservoir 42 and flange 60 urges annular face 78 against a seat 96 formed around the first and second ports 36 and 38 in body 12.

An annular cup seal member 98 carried by the second cylindrical body 74 has a face section 102 that engages the cylindrical body 74 to cover the series of openings 84 and 86 and an annular projection 100 that engages body 12 to seal seat 96 from the passage in boss 32.

When the master cylinder 10 is in the inactive condition as shown in FIG. 1, ball 88 is located on seat 82 and face 78 on the unitary structure is located on seat 96. The face section 102 on seal member 98 can flex and move away from openings 84 and 86 to allow fluid communication from reservoir 42 to compensate for any fluid needed to maintain chamber 28 full of fluid by way of a flow path through compensation port 36.

During a brake application an input force applied to pedal 110 is transmitted to piston 18 in master cylinder 10.

At a normal actuation rate, as piston 10 moves forward from the position illustrated in FIG. 1, the volume of the quick fill chamber 30 decreases and fluid is transferred to the pressurizing chamber 28 past the seal 22. During this movement, the fluid pressure in chamber 30 is not high enough to open the pressure responsive valve by lifting the valve ball 88 off its seat against the force of the spring 90. When the pressure in chamber 28 increases to a predetermined level it is desirable to prevent further transfer of fluid into chamber 28. The second stage operation of valve 54 is brought into action as spring 90 is overcome and ball 88 moves off seat 82 so that the fluid can then flow to the reservoir 42 from the quick fill chamber 30.

In the event of a fast actuation due to an operation stamping on the pedal, the fluid pressure build up in chamber 30 immediately moves ball 88 off seat 82 to allow fluid to escape to reservoir 42 from chamber 30 but the flow through opening 80 to the reservoir alone is not enough since fluid also flows to and adversely affects the fluid pressure build up in chamber 28. However, as the fluid pressure build up in chamber 30 occurs through a spike application, this fluid pressure acts on and moves the unitary structure as shown in FIG. 2 causing face 78 to move off seat 96 and allow fluid to flow into the passage of boss 32 for communication to reservoir 42 by way of slots 72 after spring 92 is overcome. Spring 92 is selected such that its force is no more than 50 percent 5 greater than spring 90 such that the fluid pressure build up in chamber 30 even with a spike application and the limited flow through restriction or opening 90 does not result in excessive fluid being communicated to chamber 28.

When the input force on pedal 110 terminates, piston 18 moves toward the rest position shown in FIG. 1. Spring 92 moves the unitary structure such that face 78 is against seat 96 and spring 90 moves ball 88 against seat 82. As piston 18 moves during the return stroke, flap 102 moves away from openings 84 and 86 to allow fluid from reservoir 42 to flow into chamber 30.

I claim:

1. In a master cylinder having a body with a stepped bore therein, a piston located in said stepped bore having opposite ends slidable in said stepped bore, said piston defining in said stepped bore a low volume pressure chamber and a larger volume quick-fill chamber, a first port in said body for connecting a passage from a reservoir with said larger volume pressure chamber and a second port in said body for connecting said passage with said low volume pressure chamber, and valve means for controlling communication of fluid between said reservoir and bore to compensate for changes in the volume of fluid in said bore and to allow fluid to be released from said larger volume chamber when a fluid pressure therein reaches a predetermined level, the improvement in said valve means comprising:

a first cylindrical body having a closed end with a first diameter section connected to a second diameter section by a radial-flange section, said radial flange section having a plurality of axial passages therethrough, said second diameter section having a plurality of linear slots on its peripheral surface and a series of tabs projecting from its inner surface, said first cylindrical body having a bore that extends from said flange section into said first diameter section;

a second cylindrical body having a lip on a first end and a first annular seat on a second end, said tabs on the inner surface of said second diameter section of said first cylindrical body engaging said lip to define a unitary structure, said second cylindrical body having a central opening surrounded by series of openings, said second cylindrical body having a second annular seat separating said central opening from said series of openings;

a spherical member located in said bore of said first cylindrical body;

a first resilient member located in said first cylindrical body bore for urging said spherical member toward said second annular seat;

a second resilient member located in said passage of said master cylinder body and acting on said first cylindrical body for urging said first annular seat against said master cylinder body, said first annular seat engaging said master cylinder body to surround said first and second ports; and a third resilient member connected to said second cylindrical body having a face member that controls communication through said series of openings, said piston responding to an input by moving in said bore of the master cylinder to create an operational fluid pressure in said low volume and quick fill chambers, said fluid pressure in said quick fill chamber being communicated to said low volume chamber to assist in supplying operational fluid to a brake system and through said first port to act on said face of said third resilient member to prevent the flow of fluid though said series of opening while allowing operational fluid pressure to be communicated through said central opening from said quick fill chamber to act on said spherical member, said operational fluid pressure overcoming said first resilient member at a predetermined fluid pressure level to allow fluid to be communicated to said reservoir and thereby limit the fluid pressure development in said quick-fill chamber, said operational fluid pressure communicated through said first port acting on said second cylindrical body and at a second preset fluid pressure level overcoming said second resilient member to move said first and second cylindrical bodies and allow fluid to be communicated into said passage through said linear slots for delivery to said reservoir.

2. The master cylinder as recited in claim 1, wherein said first predetermined fluid pressure level is lower than said second fluid pressure level, said second fluid pressure level limiting the fluid pressure build up in said quick fill chamber produced by a rapid movement of said piston.

3. The master cylinder as recited in claim 2, wherein said master cylinder further includes:
 a first stop member located in said bore of said first cylindrical body to limit the movement of said spherical member; and
 a second stop member located in said passage for limiting the movement of said unitary structure.

4. The master cylinder as recited in claim 3, wherein said third resilient member includes:
 an annular ring that extends from a cup shaped member, said annular ring engaging said master cylinder body to seal said first and second ports from said passage when said second resilient member urges said unitary structure into engagement with said body.

* * * * *